United States Patent
Richardson, III et al.

(10) Patent No.: US 8,387,748 B2
(45) Date of Patent: Mar. 5, 2013

(54) COMPOSITE LAMINATE FOR A THERMAL AND ACOUSTIC INSULATION BLANKET

(75) Inventors: Llewellyn Bentley Richardson, III, Chesterfield, VA (US); Jian Wang, Guangzhou (CN); Warren Francis Knoff, Richmond, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/596,307

(22) Filed: Aug. 28, 2012

(65) Prior Publication Data

US 2012/0321868 A1 Dec. 20, 2012

Related U.S. Application Data

(63) Continuation of application No. 12/759,741, filed on Apr. 14, 2010, now Pat. No. 8,292,027.

(51) Int. Cl.
*E04B 1/84* (2006.01)
(52) U.S. Cl. .............. 181/294; 181/290; 181/284
(58) Field of Classification Search .......... 181/294, 181/284, 292, 290
See application file for complete search history.

(56) References Cited

U.S. PATENT DOCUMENTS

| | | | |
|---|---|---|---|
| 5,373,038 | A | 12/1994 | Horacek |
| 5,760,146 | A | 6/1998 | von Gentzkow et al. |
| 6,322,022 | B1 | 11/2001 | Fay et al. |
| 6,565,040 | B2 | 5/2003 | Fay et al. |
| 6,627,561 | B1 | 9/2003 | Wulliman et al. |
| 6,670,291 | B1 | 12/2003 | Tompkins et al. |
| 2005/0173780 | A1 | 8/2005 | Sethumadhavan et al. |
| 2006/0046598 | A1 | 3/2006 | Shah |
| 2006/0128866 | A1 | 6/2006 | Diakoumakos et al. |
| 2008/0153373 | A1 | 6/2008 | Hall et al. |
| 2008/0156367 | A1 | 7/2008 | Uschold et al. |
| 2008/0189840 | A1 | 8/2008 | Knoff et al. |
| 2008/0254313 | A1 | 10/2008 | Kennedy et al. |
| 2009/0094754 | A1 | 4/2009 | Hall, III et al. |
| 2009/0269565 | A1 | 10/2009 | Peng |
| 2009/0314480 | A1 | 12/2009 | Grinbergs et al. |
| 2010/0056687 | A1 | 3/2010 | Diakoumakos et al. |
| 2010/0243807 | A1 | 9/2010 | Hossain et al. |

OTHER PUBLICATIONS

Khang D. Tran, Light Weight Fire Barrier Materials for Aircraft Fuselage Thermal/ Acoustical Insulation; The Mexmil Company, Santa Ana, California, USA.

*Primary Examiner* — Forrest M Phillips

(57) ABSTRACT

This invention is directed to a composite laminate comprising in order (a) a flame retardant polymeric moisture barrier (b) an inorganic platelet layer and (c) a flame retardant thermoplastic film layer The invention is also directed to a thermal insulation and acoustic blanket comprising a core of fibrous material or foam surrounded by the above composite laminate wherein the thermoplastic film layer of the composite laminate contacts and encapsulates the core.

6 Claims, 1 Drawing Sheet

COMPOSITE LAMINATE FOR A THERMAL AND ACOUSTIC INSULATION BLANKET

The present application is a continuation of U.S. application Ser. No. 12/759,741 filed Apr. 14, 2010.

BACKGROUND OF THE INVENTION

1. Field of Invention

This invention covers composite thermal laminates having flame resistant properties. The invention also covers use of the composite laminate in a thermal and acoustic blanket as may be found in an aircraft fuselage or a turbine engine compartment.

2. Background of the Invention

U.S. Pat. No. 6,322,022 to Fay et al. discloses burnthrough resistant systems for transportation especially aircraft.

U.S. Pat. No. 6,670,291 to Tomkins and Vogel-Martin describes a laminate sheet material for fire barrier applications.

There remains an ongoing need for thermal and acoustic blankets for aircraft structures having reduced weight and improved flame spread resistance.

SUMMARY OF INVENTION

This invention is directed to a composite laminate comprising in order (a) a polymeric moisture barrier having a thickness from 6.0 to 25.0 micrometers and a UL 94 flame classification of V-0, (b) an inorganic platelet layer having a thickness from 7.0 to 76.0 micrometers and a UL 94 flame classification of V-0 wherein the platelets comprising the platelet layer have an aspect ratio of from 100 to 20,000, and (c) a thermoplastic film layer having a thickness no greater than 25 micrometers, an average elongation to break no greater than 150% and a UL 94 flame classification of V-0. The invention is also directed to a thermal insulation and acoustic blanket comprising an inorganic or organic core surrounded by the above composite laminate wherein the thermoplastic film layer of the composite laminate contacts and encapsulates the core.

DETAILED DESCRIPTION OF THE INVENTION

Figure 1:
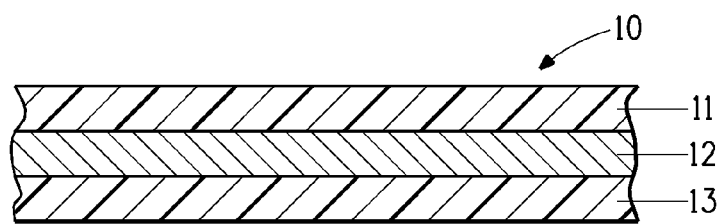
FIG. 1 is a schematic cross section through a burnthrough resistant composite laminate of this invention.

FIG. 1 shows a section through a burnthrough resistant composite laminate 10 comprising a polymeric moisture barrier 11, an inorganic platelet layer 12 and a thermoplastic film layer 13.

Moisture Barrier Layer

By moisture barrier is meant that the polymeric layer has an inability to pass liquids but has some ability to pass vapor. Typically, a 25 micrometer thick sample of the barrier material when tested by the water method of ASTM E96/E 96M-05 has a water vapor permeability not exceeding 60 g/(m$^2$24 h). An additional requirement is that the barrier should have a UL 94 flame classification of V-0. UL 94 flame classification is an Underwriters Laboratory test, The Standard for Flammability of Plastic Materials for Parts in Devices and Appliances, which measures a material's tendency either to extinguish or to spread the flame once the specimen has been ignited. V-0 indicates that the material is tested in a vertical position and self-extinguished within ten seconds after the ignition source is removed. A further requirement of the moisture barrier is that it should have a thickness in the range of from 6.0 to 25 micrometers. More preferably the thickness range should be from 6.0 to 20.0 micrometers and most preferably in the range from 6 to 10 micrometers.

The barrier layer further provides mechanical strength and stiffness to the laminate as well as protecting the inorganic platelet layer. Preferred film materials are fluoropolymer, polyimide, polyetheretherketone (PEEK) and polyetherketoneketone (PEKK) all of which are commercially available. A suitable fluoropolymer is available from E.I. du Pont de Nemours, Wilmington, Del. under the tradename Tedlar. The surface of the barrier layer in contact with the inorganic platelet layer may optionally be treated to improve wetability and/or adhesion with the inorganic platelet layer. Suitable surface treatment methods include, but are not limited to, corona etching and washing with coupling agents such as ammonium, phosphonium or sulfonium salts. The outer surface of the barrier layer i.e. the surface not in contact with the inorganic platelet layer may optionally be coated with polyterafluoroethylene (PTFE) or may be metalized.

Platelet Layer

The thickness of an individual platelet typically ranges from about 5 Angstroms to about 5,000 Angstroms more preferably from about 10 Angstroms to about 4,200 Angstroms. The mean value of the maximum width of a platelet typically ranges from about 10,000 Angstroms to about 30,000 Angstroms The aspect ratio of an individual platelet typically ranges from 100 to 20,000.

In one embodiment of this invention, the inorganic platelet layer contains 100% platelets i.e. there is no carrier material such as resin, adhesive, cloth or paper. However, there may be some residual dispersant arising from incomplete drying of the platelet dispersion.

In another embodiment of this invention, a lightweight open weave fabric scrim is embedded into or laid onto the inorganic platelet layer to provide additional mechanical strength to the layer. The scrim can be made from natural, organic or inorganic fibers with glass, cotton, nylon or polyester being typical examples. A glass fiber scrim is particularly preferred for embedding into the platelet layer. The scrim may be a woven or knit structure and has a typical areal weight not exceeding 40 grams per square meter. The scrim is positioned into the platelet layer either after the platelet material has been coated onto the moisture barrier layer or while the platelet material is being coated onto the moisture barrier layer.

It is a requirement that the thickness of the platelet layer, without scrim, is from 7.0 to 76 micrometers and more preferably from 7.0 to 50 micrometers. A further requirement is that the platelet layer has a UL 94 flame classification of V-0. The function of the platelet layer, in which adjacent platelets overlap, is to provide a flame and hot gas impermeable barrier. The inorganic platelets may be clay, such as montmorillonite, vermiculite, mica, talc and combinations thereof. Preferably, the inorganic oxide platelets are stable (i.e., do not burn, melt or decompose) at about 600 degrees C., more preferably at about 800 degrees C. and most preferably at about 1000 degrees C. Vermiculite is the preferred platelet material for this invention. Vermiculite is a hydrated magnesium aluminosilicate micaceous mineral found in nature as a multilayer crystal. Vermiculite typically comprises by (dry) weight, on a theoretical oxide basis, about 38-46% $SiO_2$, about 16-24% MgO, about 11-16% $Al_2O_3$, about 8-13% $Fe_2O_3$ and the remainder generally oxides of K, Ca, Ti, Mn, Cr, Na, and Ba. "Exfoliated" vermiculite refers to vermiculite that has been treated, chemically or with heat, to expand and separate the layers of the crystal, yielding high aspect ratio vermiculite platelets. Suitable vermiculite materials are available from W. R. Grace of Cambridge, Mass., under the trade designations MicroLite 963 and MicroLite HTS-XE.

Film Layer

It is a requirement that the thermoplastic film layer has a thickness no greater than 25 micrometers. In a preferred embodiment, the thermoplastic film layer has a thickness no greater than 15 micrometers. More preferably the thickness is no greater than 10 micrometers. An additional requirement is that the thermoplastic film layer also has a UL 94 flame classification of V-0. A further requirement of this film layer is that the average elongation to break of the film is no greater than 150% and more preferably no greater than 125%. By average elongation we mean the average value of the elongation as measured in the machine direction and in the transverse direction which is a direction orthogonal to the machine direction. Preferably the film layer must also be capable of softening. By softening we mean that the film layer can soften sufficiently to bond to another thermoplastic film layer without completely melting. Preferred thermoplastic materials are polyketone, polyimide, polysulfone, polyarylene sulfide, fluoropolymers, liquid crystal polymers and polycarbonate. Examples of polyketone are polyetheretherketone (PEEK) and polyetherketoneketone (PEKK). Polyethersulfone and polyphenylsulfone are examples of polysulfone. Poly(p-phenylene sulfide is a suitable polyarylene sulfide for use in this invention. Polyvinylfluoride (PVF) and polyvinylidinefluoride (PVDF) are suitable examples of fluoropolymers. Polyarylate is an example of a suitable liquid crystal polymer. Some of these films may also be coated with a second polymeric material. For example, a polyimide film, Kapton®, may be coated with fluorinated ethylene propylene, FEP and used in this invention.

In a preferred embodiment, the moisture barrier membrane layer is polyimide and the thermoplastic film layer is PEKK.

Acoustic Blanket

The composite laminate as described above may be used as a component in a thermal insulation and acoustic blanket. A thermal insulation and acoustic blanket of this invention comprises:

(a) an inorganic or organic core having a self extinguishing time no greater than 10 seconds and a maximum burn length of no greater than 102 mm when tested in accordance with BSS7230 Method F1.

(b) a composite laminate surrounding the core material the laminate further comprising (1) a polymeric moisture barrier having a thickness from 6.0 to 25.0 micrometers and a UL 94 flame classification of V-0, (2) an inorganic platelet layer having a thickness from 7.0 to 76.0 micrometers and a UL 94 flame classification of V-0 wherein the platelets comprising the platelet layer have an aspect ratio of from 100 to 20,000, and (3) a thermoplastic film layer having a thickness no greater than 25 micrometers, an average elongation to break no greater than 150% and a UL 94 flame classification of V-0, wherein the thermoplastic film layer of the composite laminate contacts and encapsulates the core.

Figure 2:
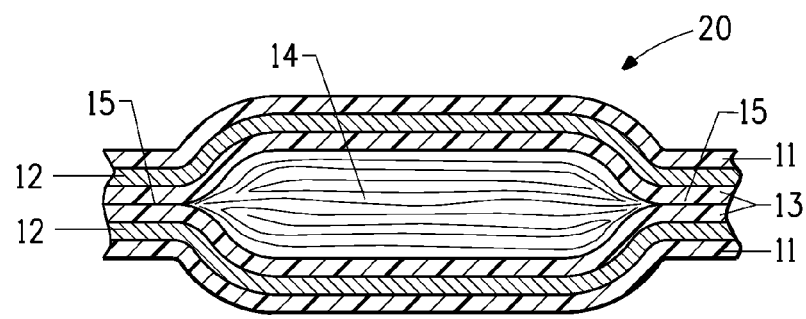
FIG. 2 is a schematic cross section through a thermal and acoustic blanket incorporating a burnthrough resistant composite laminate of this invention.

FIG. 2 shows a section through a thermal and acoustic blanket 20 suitable for use in an aircraft fuselage comprising a core material 14 encapsulated by a burnthrough resistant composite laminate said composite laminate comprising, in order, a thermoplastic film layer 13 in contact with the core, an inorganic platelet layer 12 and a moisture barrier 11 forming the outer surface of the laminate. The blanket is placed against the interior skin of an aircraft fuselage.

It is a requirement for the core 14 to meet the following flammability requirements. In a vertical test (60 seconds ignition), when tested according to Federal Aviation Regulation, Section 25, Appendix F, Part1, the core must be self extinguishing in no greater than 10 seconds and must have a maximum burn length of no greater than 102 mm. In a 45 Degree Angle Test, when tested according to BSS7230, the self extinguishing time must be no greater than 5 seconds and the afterglow no greater than 10 seconds.

The core may be foam or an organic or inorganic fibrous material. A suitable foam material is polyimide available under the tradename INSULMIDE from Johns Manville Insulations Group, Denver, Col. or SOLIMIDE from Inspec Foams, Allen, Tex. Suitable non-metallic fibers include, but are not limited to, glass fibers, aramid fibers, crystalline ceramic oxide (including quartz) fibers, silicon nitride fibers, silicon carbide fibers, oxidized polyacrylonitrile fibers, carbon fibers, and combinations thereof.

Glass fiber is a preferred material with E-glass, a low alkali borosilicate glass, being particularly suitable. Ceramic oxide materials are typically metal oxides that have been consolidated by the action of heat. Ceramic oxide fibers generally refer to a class of fibers typically containing one or more oxides of aluminum, silicon, and boron. Many other additives may also be present (e.g., oxides of sodium, calcium, magnesium, and phosphorus) within the fibers, although the fibers include primarily metal oxides. Typically, the ceramic oxide fibers are crystalline ceramics and/or a mixture of crystalline ceramic and glass (i.e., a fiber that contains both crystalline ceramic and glass phases). Preferred ceramic oxide fibers are aluminosilicate, aluminoborosilicate, and alumina fibers, and may be in the form of yarns or in the form of staple fibers. The preferred form of non-metallic fiber is a batting which is a soft bulky assembly of fibers, usually carded. Battings have a typical density range of from 5.5 to 24.0 kg./$m^3$. Suitable glass batting is available under the MICROLITE AA tradename from Johns Manville OEM Insulations Division, Denver, Col. The core may comprise more than one layer of material. The materials in different layers of the core need not be the same.

The core is encapsulated by the composite laminate. This is achieved by wrapping the composite laminate around the core 14 such that the thermoplastic film layer 13 is adjacent to the core. The composite laminate is subjected to sufficient heat to partially soften and fuse together the two thermoplastic film layers, as shown at 15 in FIG. 2. The thermoplastic film layers on the upper and lower surfaces of the core thus encapsulate the core around all four of its edges. The partial softening can be achieved by means such as heat guns or ultrasonic bonding. The relative amount of core and laminate materials can be adjusted to suit particular thermal and acoustic blanket specifications but the general objective is to meet the necessary flame and noise standards at as low a blanket weight as possible. The moisture barrier outer layer of the blanket assembly minimizes moisture uptake and hence weight gain of the blanket during service. The composite laminate provides a flame spread barrier to the blanket assembly.

Test Methods

Figure 3:
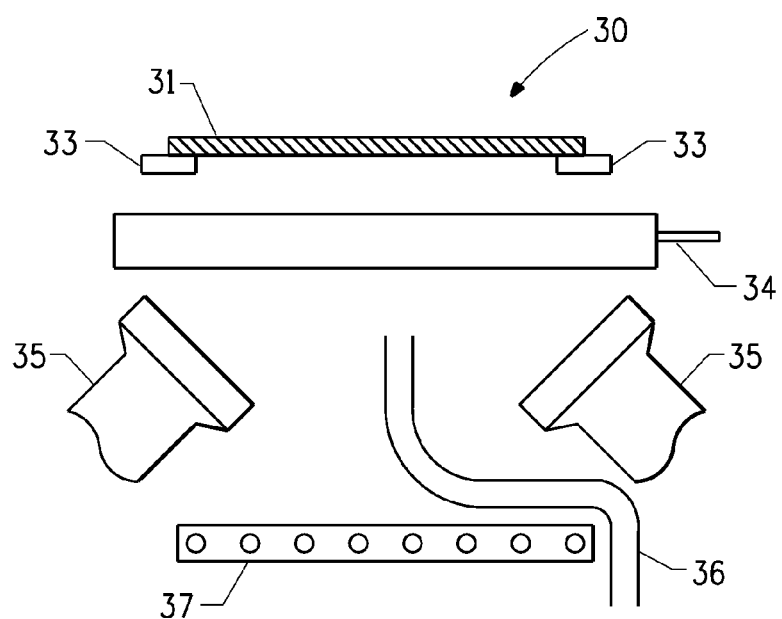
FIG. 3 is a schematic of the equipment used for the burnthrough test.

Burnthrough time was measured on a modified thermal protective performance (TPP) instrument as specified in Section 8.2 of NFPA 2112: Standard on Flame-Resistant Garments for Protection of Industrial Personnel Against Flash Fire, 2007 Edition. This is further explained by reference to FIG. 3. The TPP instrument, shown generally at 30, comprises two Meeker burners 35 positioned at 45 degree angles to the vertical providing flames that intersect to impinge the sample 31. In addition there is a bank of quartz tubes 37 that provides radiant heat. The sample is held in position by supports 33. A 9.5 mm copper airflow tube 36 allows approximately 20 liters per minute of air flow through the flame thus providing mass flux pressure beneath the sample. This allows the simulation of mass flux specified in Federal Aviation Regulation (FAR) 25.856(b). Propane flow to the burners was set at 5.0 liters per minute to produce an overall heat flux at the sample of 2.3 cal/cm$^2$-sec. with temperatures exceeding 1000° C. A water cooled shutter 34 prevents flame and heat from reaching the sample until the test is ready to start at which time the shutter is removed. Samples were subjected to the heat and mass fluxes until a hole developed in the sample, at which point the time was recorded as the burnthrough time and the test completed.

EXAMPLES

In the following examples, all parts and percentages are by weight and all degrees in centigrade unless otherwise indicated. Examples prepared according to the current invention are indicated by numerical values. Control or Comparative Examples are indicated by letters. Data and test results relating to the Comparative and Inventive Examples are shown in Table 1.

Example A was a 127 micron thick sample of Nomex® Type 418™ paper having an areal weight of 149 g/m$^2$. Nomex® Type 418™ is paper produced by blending about 50% mica platelets with short fibers (floc) and filmy particles (fibrids) of a synthetic m-aramid polymer followed by calendaring the paper at elevated temperature and pressure. Nomex® Type 418™ paper is available from E.I. DuPont de Nemours, Wilmington, Del. The use of Nomex® Type 418™ as a burnthrough barrier paper for aircraft thermal blanket applications is further described in U.S. Pat. Nos. 6,627,561 and 6,670,291 as well as in PCT patent application WO2006/028666. Three samples of this paper were submitted to the burnthrough test and gave burn times in the range of 1.05 to 2.28 minutes with an average burn time of 1.61 minutes. The end of test times were the same as the burn though times. The grade of a paper tested is compliant with FAR 25.856(b).

Example 1 was prepared in the following manner. A 7.6 micron layer of polyimide film available from DuPont under the tradename Kapton was used as the moisture barrier. The polyimide film had an areal weight of 12.2 g/m$^2$. An aqueous dispersion of MicroLite® 963 grade vermiculite platelets were used as received and coated onto the polyimide film using an adjustable micrometer film applicator from the Paul N. Gardner Company Inc., Pompano Beach, Fla. The coated vermiculite film was dried overnight at room temperature to remove residual dispersant. The vermiculite layer had an areal weight of 37.9 g/m$^2$. A 6.0 micrometer thick layer of PEKK having an areal weight of 9.2 g/m$^2$ and an average elongation to break of 120% was used as the thermoplastic film layer and was placed onto the vermiculite layer. The composite assembly was then placed in a press at a temperature of 180° C. for 40 seconds to consolidate the layers together into a laminate weighing 59.3 g/m$^2$. The consolidated composite laminate was subjected to the burnthrough test. There was no burnthrough after 5 minutes when the test was stopped. The composite laminate weighed only 40% of that of the Nomex® Type 418™ comparator yet had a far superior burnthrough resistance.

Example 2 was prepared in the following manner. A 6.0 micrometer thick layer of PEKK having an areal weight of 9.2 g/m$^2$ was used as the moisture barrier. Platelets of MicroLite®963 grade were coated onto the PEKK film as in Example 1. The coated film was dried overnight at room temperature to remove residual traces of dispersant. The vermiculite layer had an areal weight of 51.1 g/m$^2$. A 6.0 micrometer thick layer of PEKK having an areal weight of 9.2 g/m$^2$ and an average elongation to break of 120% was used as the thermoplastic film layer and was placed onto the vermiculite layer. The composite assembly was then placed in a press at a temperature of 180° C. for 40 seconds to consolidate the layers together into a laminate weighing 69.5 g/m$^2$. The consolidated composite laminate was subjected to the burnthrough test. There was no burnthrough after 5 minutes when the test was stopped. The composite laminate weighed only 47% of that of the Nomex® Type 418™ comparator yet had a far superior burnthrough resistance.

TABLE 1

| Example | Laminate Description | Burnthrough Time (min) | End of Test Time (min) |
| --- | --- | --- | --- |
| A | 127 micron Nomex ® Type 418 ™ @ 149 gsm | 1.61 | 1.61 |
| 1 | 59.3 gsm composite of Kapton ®, vermiculite and PEKK | No burnthrough | 5 |
| 2 | 69.5 gsm composite of PEKK, vermiculite and PEKK | No burnthrough | 5 |

It is contemplated that the composite laminate of Examples 1 or 2 can be combined with a core of fiberglass batting such as a 25.4 mm thick sheet of Microlite® AA having a density of 6.7 Kg/m$^3$. In such a combination, a sheet of composite laminate is placed over both outer surfaces of the batting such that the thermoplastic film layer of the laminate is adjacent to, and in contact with, the outer surfaces of the batting. Furthermore, the composite laminates are of a larger area than the batting and extend over the four edges of the batting. The batting is encapsulated by crimping together the ends of the composite laminates that extend over the batting and, by applying heat in the crimp zone to soften and fuse the two laminates together, the batting is encapsulated.

It is also contemplated that the composite laminate of Examples 1 or 2 can be combined with a core of polyimide foam such as a 25.4 mm thick sheet of Solimide® TA-301 having a density of 6.4 Kg/m$^3$. In such a combination, a sheet of composite laminate is placed over both outer surfaces of the foam such that the thermoplastic film layer of the laminate is adjacent to, and in contact with, the outer surfaces of the foam. Furthermore, the composite laminates are of a larger area than the foam and extend over the four edges of the foam. The foam is encapsulated by crimping together the ends of the composite laminates that extend over the foam and, by applying heat in the crimp zone to soften and fuse the two laminates together, the foam is encapsulated.

What is claimed is:
1. A composite laminate comprising in order
  (a) a polymeric moisture barrier having a thickness from 6.0 to 25.0 micrometers and a UL 94 flame classification of V-0,

(b) an inorganic platelet layer having a thickness from 7.0 to 76.0 micrometers and a UL 94 flame classification of V-0 wherein the platelets comprising the platelet layer have an aspect ratio of from 100 to 20,000,
wherein, the inorganic platelet layer consists of 100% platelets without carrier material, and
(c) a thermoplastic film layer having a thickness no greater than 25 micrometers, an average elongation to break no greater than 150% and a UL 94 flame classification of V-0.

2. The composite laminate of claim 1 wherein the moisture barrier contains a polymer wherein the polymer is selected from the group consisting of fluoropolymer, polyimide, polyetheretherketone and polyetherketoneketone.

3. The composite laminate of claim 1 wherein the outer surface of the moisture barrier is metalized.

4. The composite laminate of claim 1 wherein the inorganic platelet layer contains platelets selected from the group consisting of clay, vermiculite, mica, talc and combinations thereof.

5. The composite laminate of claim 1 wherein the thermoplastic film contains polymer selected from the group consisting of polyketone, polyimide, polysulfone, polyarylene sulfide, fluoropolymer, liquid crystal polymer and polycarbonate.

6. The composite laminate of claim 5 wherein the thermoplastic film contains polymer selected from the group consisting of polyetheretherketone, polyetherketoneketone, polyetherimide, polyethersulfone, polyphenylsulfone, poly (p-phenylenesulfide), polyvinylfluoride, polyvinylidinefluoride and polyarylate.

* * * * *